United States Patent
Gibson et al.

(10) Patent No.: US 9,213,211 B2
(45) Date of Patent: Dec. 15, 2015

(54) LUMINESCENT PIXEL ASSEMBLY

(75) Inventors: Gary Gibson, Palo Alto, CA (US); Xia Sheng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/876,423

(22) PCT Filed: Oct. 3, 2010

(86) PCT No.: PCT/US2010/051244
§ 371 (c)(1),
(2), (4) Date: Mar. 27, 2013

(87) PCT Pub. No.: WO2012/047190
PCT Pub. Date: Apr. 12, 2012

(65) Prior Publication Data
US 2013/0182313 A1 Jul. 18, 2013

(51) Int. Cl.
*G02B 26/00* (2006.01)
*G09G 3/19* (2006.01)
*G02F 1/133* (2006.01)
*G02F 1/167* (2006.01)

(52) U.S. Cl.
CPC ........ *G02F 1/167* (2013.01); *G02F 2001/1678* (2013.01); *G02F 2202/046* (2013.01)

(58) Field of Classification Search
CPC .. G02B 26/0841; G02B 26/001; G03G 13/22; G03G 17/04; G09G 3/16; G02F 1/163; G02F 1/167; G02F 1/1393; G02F 1/136213; G02F 3/00; G02F 2203/50
USPC ........ 359/245, 315, 247, 251–252, 254, 108, 359/237–238, 278–279, 290–292, 298, 359/300–302, 296, 259; 430/31–32; 345/49, 105, 107; 349/33, 38
See application file for complete search history.

(56) References Cited

U.S. PATENT DOCUMENTS

| | | |
|---|---|---|
| 7,075,502 B1 | 7/2006 | Drzaic et al. |
| 7,227,525 B2 | 6/2007 | Kishi |
| 7,283,119 B2 | 10/2007 | Kishi |
| 7,609,435 B2 | 10/2009 | Moriyama et al. |
| 2006/0209010 A1* | 9/2006 | Ding et al. .................... 345/107 |
| 2006/0228532 A1 | 10/2006 | Sun et al. |
| 2006/0240286 A1* | 10/2006 | Park et al. ...................... 428/690 |
| 2007/0040499 A1* | 2/2007 | Mizuno ......................... 313/509 |
| 2008/0094688 A1* | 4/2008 | Baesjou et al. ............... 359/296 |
| 2008/0304135 A1 | 12/2008 | Van Delden et al. |
| 2009/0251763 A1 | 10/2009 | Sprague et al. |
| 2010/0033798 A1* | 2/2010 | Wang et al. ................... 359/290 |
| 2012/0193579 A1* | 8/2012 | Kempfert et al. ........ 252/301.36 |

FOREIGN PATENT DOCUMENTS

| | | |
|---|---|---|
| EP | 1995630 | 5/2008 |
| JP | 08-190353 | 2/1998 |

(Continued)

*Primary Examiner* — Dawayne A Pinkney
(74) *Attorney, Agent, or Firm* — Michael A Dryja

(57) ABSTRACT

An assembly corresponding to a pixel includes sub-assemblies that each correspond to a sub-pixel of the pixel. At least one of the sub-assemblies includes a luminescent fluid, black particles and a mirror. The luminescent fluid converts wavelengths of light less than a conversion wavelength of the sub-assembly to the conversion wavelength. The black particles are positionable within luminescent fluid in accordance with a color to be displayed by the assembly. The mirror is disposed at a bottom end of the sub-assembly.

15 Claims, 4 Drawing Sheets

(56) References Cited

FOREIGN PATENT DOCUMENTS

| | | |
|---|---|---|
| JP | 2004-054287 | 11/2004 |
| JP | 2007-065215 | 10/2007 |
| KR | 10-2006-0067103 | 5/2005 |
| TW | I226503 | 1/2005 |
| TW | I227365 | 2/2005 |
| TW | 200636659 | 10/2006 |
| TW | 200907524 | 2/2009 |
| WO | WO-9953373 A1 | 10/1999 |

* cited by examiner

LUMINESCENT PIXEL ASSEMBLY

CROSS-REFERENCE TO RELATED APPLICATION

This application is a U.S. National Stage Application of and claims priority to International Patent Application No. PCT/US2010/051244, filed on Oct. 3, 2010, and entitled "LUMINESCENT PIXEL ASSEMBLY."

BACKGROUND

Display devices traditionally operate by refreshing the displayed image a number of times per second, such as sixty times per second. When power is removed from such a display device, the display device no longer displays an image. Examples of these types of display devices include cathode-ray tube (CRT) display devices, as well as flat-panel display devices that employ plasma, light-emitting diode (LED), and/or some types of liquid crystal display (LCD) technologies.

More recently a type of display device has been introduced in which an image remains displayed even when power is removed from the display device. Power is utilized in such so-called bistable or multistable display devices primarily when the state of the image being displayed has to be changed. This type of display device uses less power than conventional display devices. Currently, this type of display device is most commonly used for electronic book reader ("e-reader") devices available from a number of different manufacturers.

Displays can be broadly categorized as either emissive or reflective. Emissive display devises have their own light sources, which emit light and thus can be used even in low ambient light conditions. Reflective display devices do not require their own light sources, but instead rely on the modulated reflection of ambient light, although in some cases reflective displays are provided with an auxiliary light source for viewing in low ambient light conditions. Reflective display devices typically use less power than emissive display devices because they do not need to provide their own light and because they are often multistable; that is, the image remains even when power is removed from such a display device. Although emissive display devices are more easily viewed in low ambient light conditions, reflective displays provide better viewing in bright outdoor lighting where stray reflections often overwhelm the relatively weak light source of emissive displays.

DETAILED DESCRIPTION

As noted in the background section, reflective displays can be used without an internal light source and are often multistable, thus requiring less power than an emissive display. Currently most reflective display devices can only display monochrome or grayscale images, and not full-color images. Such reflective display devices that can display color images are thus far suboptimal, in that they do not display the full gamut of color, and/or display dim color images that appear washed out.

By comparison, the disclosed reflective display device displays a full-color image that is more optimal. The reflective display device disclosed herein can display images with a wider, brighter color gamut than existing display devices. As such, the disclosed reflective display device is advantageous as compared to existing display devices.

Figure 1:
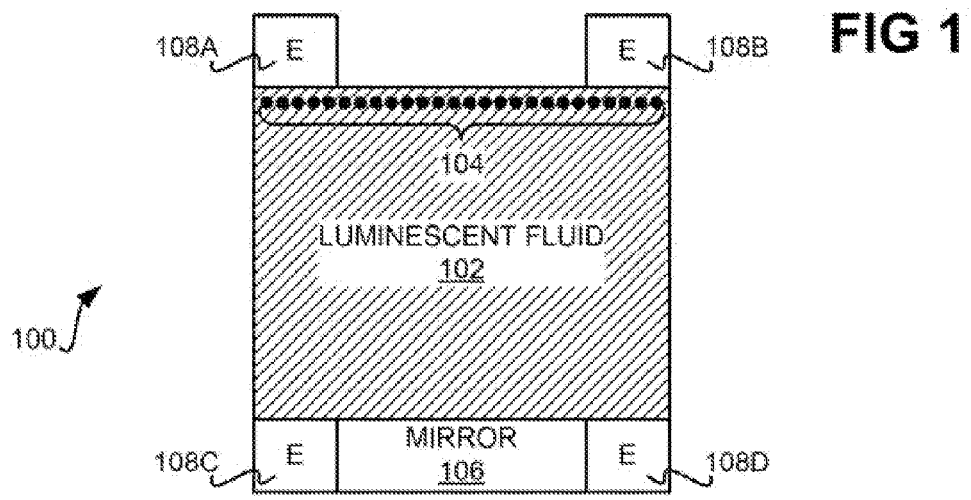
FIG. 1 is a diagram of a sub-assembly corresponding to a sub-pixel of a pixel, according to an embodiment of the disclosure.

FIG. 1 shows a luminescent sub-pixel sub-assembly 100, according to an embodiment of the disclosure. The sub-assembly 100 corresponds to a sub-pixel of a pixel. For example, the sub-assembly 100 can correspond to a red sub-pixel, a green sub-pixel, or a blue sub-pixel to display the red, green, or blue part (or component) of the pixel. Light, including visible (white) light, enters the sub-assembly 100 at its top end.

The sub-assembly 100 includes a luminescent fluid 102 within which black particles 104 are positionable. There is a mirror 106 disposed at the bottom end of the sub-assembly 100. In the embodiment of FIG. 1, the black particles 104 are positionable within the luminescent fluid 102 responsive to an electric field generated within the fluid 102 by electrodes 108A, 108B, 108C, and/or 108D, which are collectively referred to as the electrodes 108.

The embodiment depicted in FIG. 1 with respect to the electrodes 108 is provided as an example, and does not limit other configurations in which such electrodes 108 may be arranged. For instance, in another embodiment the electrodes 108A and 108B can be replaced by a single transparent electrode that extends across the top of the sub-pixel 100. In general, there are at least two electrodes 108. In the embodiment of FIG. 1, the electrodes 108A and 108B are located at the top end of the luminescent fluid 102 and are separated from one another by a gap. Similarly, the electrodes 108C and 108D are located at the bottom end of the luminescent fluid 102 and are separated from one another by the mirror 106, which can be an insulating mirror. Examples of insulating mirrors include mirrors made from titanium dioxide, barium sulfate, and polytetrafluoroethylene. The electrodes 108C and 108D may also be reflective.

In at least some embodiments, once the black particles 104 have been positioned within the luminescent fluid 102 as desired, power can be removed from the electrodes 108 such that the particles 104 remain in their current position within the fluid 102. For example, the particles 104 may stick to the walls or the electrodes 108. As another example, the time it takes for the particles 104 to diffuse back within the luminescent fluid 102 may be relatively long compared to the length of time that it is desired for the image to remain stable. It is noted that the sub-assembly 100 does not require a light source to be viewable, but rather can rely upon ambient light in this respect. As such, the sub-assembly 100 can be part of a reflective display device in some embodiments.

The luminescent fluid 102 has an absorption edge wavelength such that most wavelengths of light shorter than the absorption edge wavelength are converted to an emission wavelength band that is somewhat longer than the absorption edge wavelength. The gap between the absorption edge wavelength and the emission wavelength band is referred to as the Stokes' shift of the luminescent fluid 102. In this respect, the luminescent fluid 102 may be or include luminophores having this emission wavelength band and this absorption edge wavelength. The luminophores may be luminescent dye molecules, polymers, oligomers, inorganic phosphor materials, or combinations of these materials. It is noted that the absorption edge wavelength of the luminescent fluid 102 is also referred to as a conversion wavelength.

The luminophores may be contained with small particles that are suspended within the fluid 102. Such particles may include transparent resins, polymers, and/or binders in which the luminophores are contained. To absorb ambient light over a desired broad spectrum, multiple luminophores that absorb different wavelength ranges may be employed. To tailor the final emission spectrum resulting from these luminophores, a series of luminophores may be used where the emission band of one luminophore overlaps with the absorption band of another luminophore. This overlap facilitates energy transfer from higher energy luminophores to lower energy luminophores through processes such as Förster exchange. For example, the luminophores can be a series of organic dyes, which are sometimes referred to as relay dyes, and which transfer their absorbed energy to a final emissive dye.

In another embodiment, a set of luminophores can be utilized that together absorb the desired wavelength band but have different Stokes' shifts such that their emission bands are approximately the same and which all directly contribute to emitting the desired color. For example, luminophores capable of emitting in desired wavelength bands within the red or green portions of the visible spectrum include perylene, coumarin, pyromethene, or rhodamine dyes. Such organic dyes can also be used as the absorbers, or sensitizers, in a series of relay dyes, as can various luminescent polymers, oligomers, inorganic phosphors, or quantum dots. Where a sensitizer is used, the sensitizer absorbs predetermined wavelengths of light and transfers the energy resulting from this absorption to luminophores.

It is noted that the absorption edge wavelength of the luminescent fluid 102 is shorter than the wavelengths within the emission wavelength band of the fluid 102, in at least some embodiments. Most desirably, the luminescent fluid 102 absorbs all the shorter wavelengths of the available light. In some embodiments, such wavelengths can include near-ultraviolet light.

The black particles 104 may be based on carbon black or inorganic black pigments. The black particles 104 absorb at least visible (white) light. The black particles 104 are electrophoretically charged given a non-zero zeta potential, via techniques known within colloidal science. The black particles 104 are thus positioned within the luminescent fluid 102, using the electric fields created by electrodes 108 in the embodiment of FIG. 1, such that the sub-assembly 100 displays the desired intensity of its corresponding color.

For example, the sub-assembly 100 may correspond to a red, green, or blue sub-pixel of a pixel, although the sub-assembly 100 is exemplarily described in relation to the case where it corresponds to a red sub-pixel. Therefore, if this red sub-pixel is to display a minimum value of red (i.e., no red), then the electrodes may have power applied to them such that an electric field is generated within the luminescent fluid 102 to cause the black particles 104 to be positioned at the top end of the sub-assembly 100, as depicted in FIG. 1. The black particles 104 absorb wavelengths of at least visible light, and thus do not permit light to reach the luminescent fluid 102. As such, in this case, the sub-assembly 100 outputs negligible light.

Figure 2A:
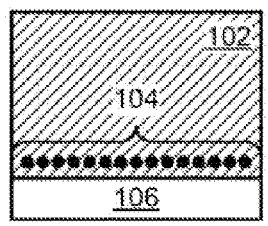
FIGS. 2A, 2B, 2C and 2D are diagrams of the sub-assembly of FIG. 1 in which particles are in various positions, according to different embodiments of the disclosure.
Figure 2B:
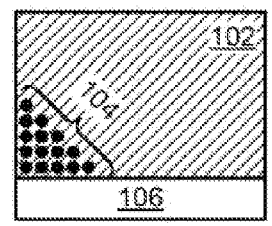

By comparison, if the red sub-pixel is to display a maximum value of red, then the electrodes 108 may have power applied to them such that an electric field is generated within the luminescent fluid 102 to cause the black particles 104 to be positioned at the bottom end of the sub-assembly 100, against the mirror 106. This case is depicted in FIG. 2A. Alternatively, the electrodes 108 may have power applied to them such that an electric field is generated within the luminescent fluid 102 to cause the black particles 104 to be positioned at a bottom corner of the sub-assembly 100. This case is depicted in FIG. 2B. It is noted that in FIGS. 2A and 2B, as well as in FIGS. 2C and 2D, the electrodes 108 have been omitted from illustrative convenience, and the mirror 106 extended across the width of the bottom of the luminescent fluid 102.

In both the cases of FIGS. 2A and 2B, light incident to the top end of the sub-assembly 100 reaches the luminescent fluid 102. The luminescent fluid 104 converts the wavelengths shorter than the absorption edge wavelength of the luminescent fluid to the red emission wavelength band of the luminescent fluid. The sub-assembly 100 outputs maximum red light, because the black particles 104 are not preventing any light from reaching the fluid 102.

In at least some situations, the configuration of FIG. 2B may be more desirable to use to produce red than the configuration of FIG. 2A. This is because some of the luminescent light in FIG. 2A is emitted downwards, whereas it is more desirable to have this light reflected upwards, as in FIG. 2B. In one embodiment, the mirror 106 in FIG. 2B can be a broadband mirror, particularly where the optical density of the luminescent fluid 102 is high enough to absorb wavelengths of light shorter than red before the wavelengths are reflected back out of the fluid 102. Where the embodiment of FIG. 2B is used to implement a green sub-pixel, the mirror 106 reflects green light, and may also reflect blue light, but should not reflect red light.

Figure 2C:
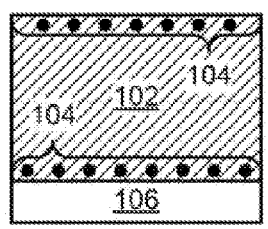

Furthermore, the red sub-pixel may display a value of red between the minimum and the maximum values of red. As such, the electrodes 108A and 108B may have power applied to them such that an electric field is generated within the luminescent fluid 102 to cause some black particles 104 to be positioned at the bottom end of the sub-assembly 100, and other black particles 104 to be positioned at the top end of the sub-assembly 100. Thus case is depicted in FIG. 2C. Alternatively, the electrodes 108A, 108B, 108C, and 108D may have power applied to them such that an electric field is generated within the luminescent fluid 102 to cause some black particles 104 to be positioned at the bottom left or right corner of the sub-assembly 100, and other black particles 104 to be positioned at the top end of the sub-assembly 100. This case is depicted in FIG. 2D.

Figure 2D:
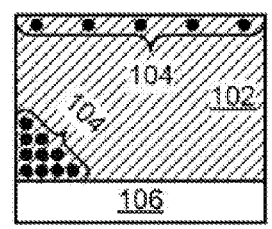

In both the cases of FIGS. 2C and 2D, just some of the light incident to the top end of the sub-assembly 100 reaches the luminescent fluid 102. The luminescent fluid 102 converts the wavelengths shorter than the absorption edge wavelength of the luminescent fluid 102 to the red emission wavelength band of the luminescent fluid 102. The sub-assembly 100 outputs less-than-maximum red light, because the black particles 104 at the top end of the sub-assembly 100 prevent some ambient light from reaching the luminescent fluid 102 and absorb some of the luminescent red light that is created by ambient light that does reach the luminescent fluid 102.

Figure 3:
FIGS. 3, 4, and 5 are each a diagram of an assembly corresponding to a pixel and that includes sub-assemblies corresponding to sub-pixels of this pixel, according to different embodiments of the disclosure.

FIG. 3 shows a luminescent pixel assembly 300, according to an embodiment of the disclosure. The pixel assembly 300 includes three sub-assemblies 100R, 100G, and 100B, collectively referred is as the sub-assemblies 100. The pixel assembly 300 corresponds to a full-color pixel, and the sub-assemblies 100 correspond to the sub-pixels of this pixel. Each sub-assembly 100 corresponds to a different color sub-pixel of the pixel of the assembly 300. The sub-assembly 100R corresponds to the red sub-pixel and is referred to as the red sub-assembly 100R; the sub-assembly 100G corresponds to the green sub-pixel and is referred to as the green sub-assembly 100G; and, the sub-assembly 100B corresponds to the blue sub-pixel and is referred to as the blue sub-assembly 100B.

Each sub-assembly 100 of FIG. 3 is implemented in accordance with FIG. 1. The emission wavelength band of the red sub-assembly 100R is in the red portion of the visible spectrum. The emission wavelength band of the green sub-assembly 100G lies in the green portion of the visible spectrum. The emission wavelength band of the blue sub-assembly 100B is in the blue portion of the visible spectrum.

In the case of the red sub-pixel, the mirror 106 of FIG. 1 disposed at the bottom end of the sub-assembly 100R can be a broadband mirror that reflects wavelengths of at least visible (white) light, or a wavelength-selective mirror reflecting just red wavelengths of light. In the case of the green sub-pixel, the mirror 106 of the green sub-assembly 100G may not reflect wavelengths of red light that do not contribute to the desired color for that sub-pixel; that is, the mirror 106 in this case is a wavelength-selective mirror reflecting just green and blue wavelengths of light. The fluid 102 in the green sub-pixel does not absorb these red wavelengths in this case so the red wavelengths would be returned to viewer if the mirror 106 did reflect them. In the case of the blue sub-pixel, the mirror 106 of the blue sub-assembly 100B may not reflect red or green wavelengths that do not contribute to the desired color for that sub-pixel; that is, the mirror 106 in this case is a wavelength-selective mirror reflecting just blue wavelengths of light.

In other embodiments, a blue sub-pixel 100 may include a mirror 106 that is a blue-reflecting mirror, but a transparent fluid rather than a blue-emitting luminescent fluid. This is because there is less available light at the short wavelengths available for harvesting by a blue luminescent fluid. Luminescence may, however, be employed for the blue sub-pixel depending on how high the internal emission efficiency of the blue luminophores is, and how efficiently the emitted light can be protected or coupled out of the corresponding sub-assembly 100.

The black particles 104 of FIG. 1 within each sub-assembly 100 of FIG. 3 are positioned within the luminescent fluid 102 of FIG. 1 within each sub-assembly 100 of FIG. 3 in accordance with the color to be displayed by the sub-assembly 300 itself. A color has a color value that in one embodiment is separable into a red value, a green value, and a blue value. The red value is provided by the red sub-pixel to which the sub-assembly 100R corresponds; the green value is provided by the green sub-pixel to which the sub-assembly 100G corresponds; and, the blue value is provided by the blue sub-pixel to which the sub-assembly 100B corresponds.

In other embodiments, however, the color value may be separable into values in addition to or in lieu of a red value, a green value, and a blue value. For example, the color value may be separable into a red value, a green value, a blue value, and a white value. As another example, the color value may be separable into a cyan value, a magenta value, a yellow value, and a white value. It is noted that any sub-pixel can provide black by simply being turned off.

The black particles 104 of the red sub-assembly 100R are thus positioned within the luminescent fluid 102 in accordance with the red value of the desired color, as has been described in relation to FIGS. 1 and 2A-2D. The black particles 104 of the green sub-assembly 100G are positioned within the luminescent fluid 102 in accordance with the green value of the desired color, in the same manner as has been described in relation to FIGS. 1 and 2A-2D. The black particles 104 of the blue sub-assembly 100B are positioned within the luminescent fluid 102 in accordance with the blue value of the desired color, also in the same manner as has been described above in relation to FIGS. 1 and 2A-2D.

As has been described above, each sub-assembly 100 converts wavelengths of light shorter than an absorption edge wavelength to the emission band wavelengths. The red emission band wavelengths are longer than the green emission band wavelengths, which are longer than the blue emission band wavelengths. Therefore, the red sub-assembly 100R converts more ambient light than the green sub-assembly 100G and the blue sub-assembly 100B do. For example, the blue sub-assembly 100B converts just ultraviolet and deep blue light, which has a shorter wavelength than the blue emission band light, and does not convert red and green light, which have longer wavelengths than blue light. As such, the amount of red light (i.e., the power of the red light) that can be maximally output by the red sub-assembly 100R is greater than the amount of green light that can be maximally output by the green sub-assembly 100G, which is greater than the amount of blue light that can be maximally output by the blue sub-assembly 100B.

To compensate for this, in one embodiment the sub-assemblies 100 of FIG. 3 may have different sizes so that when each sub-assembly 100 has its black particles 104 positioned as depicted in FIG. 2A or 2B, equal amounts of red, green, and blue light are output so that white light is output by the assembly 300 as a whole. In this embodiment the red sub-assembly 100R may be smaller in size than the green sub-assembly 100G. Likewise, the green sub-assembly 100G may be smaller in size than the blue sub-assembly 100B. Furthermore, this issue is compensated for as to the green sub-assembly 100G due to the fact that wavelengths to which the human visual system (HVS) is less sensitive are converted to wavelengths to which the HVS is more sensitive. This effect also helps compensate for this issue as to the blue sub-assembly 100B, but to a lesser extent.

Figure 4:
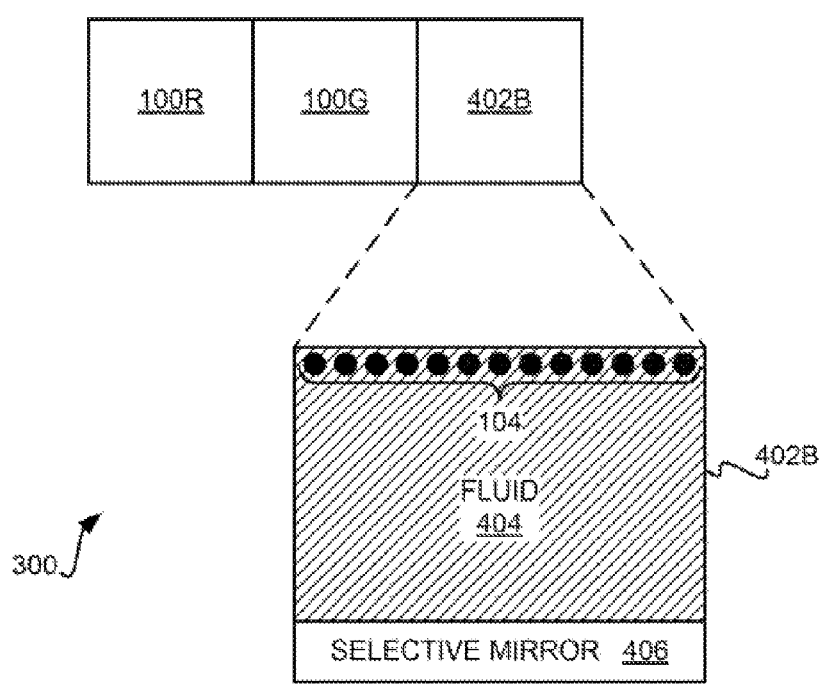
Figure 5:
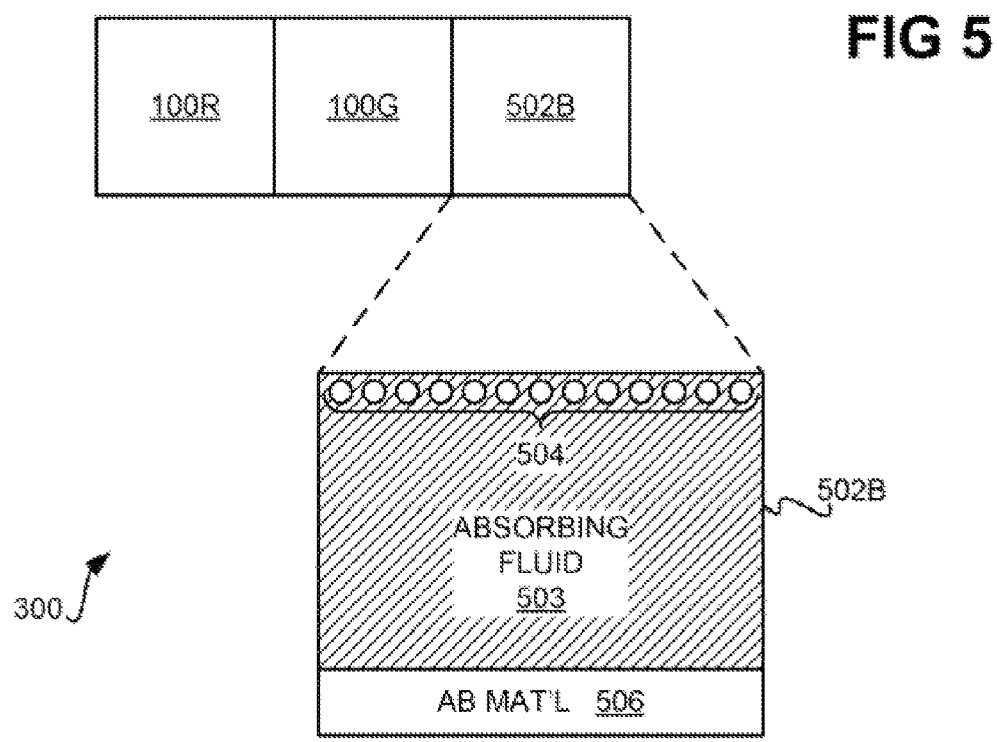
Figure 6:
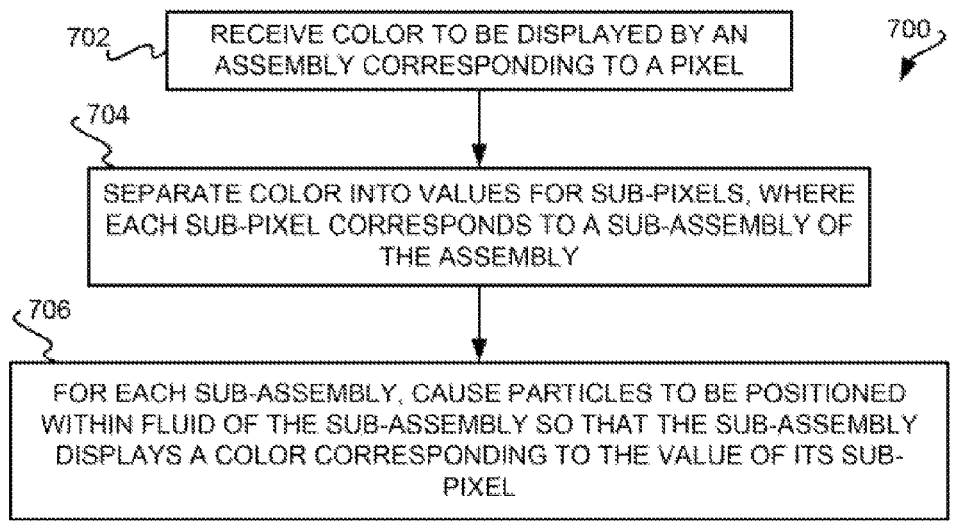
FIG. 6 is a flowchart of a method of use, according to an embodiment of the disclosure.

In other embodiments, however, in addition to and/or in lieu of having differently sized sub-assemblies 100 within a given assembly 300 corresponding to a pixel, the green sub-assembly 100G and/or the blue sub-assembly 100B may be substituted with a different type of sub-assembly. FIGS. 4, 5, and 6 show different assemblies 300 that include the red sub-assembly 100R implemented as in FIGS. 1 and 3, but that include different types of blue and/or green sub-assemblies as compared to FIG. 3, according to varying embodiments of the disclosure. Particularly, FIGS. 4 and 5 show different assemblies 300 that include different types of blue sub-assemblies 402B and 502B, respectively.

In FIG. 4, the assembly 300 includes the red sub-assembly 100R and the green sub-assembly 100G no differently than the embodiment of FIG. 3. However, the blue sub-assembly 100B has been replaced by the blue sub-assembly 402B. As depicted in FIG. 4, the blue sub-assembly 402B includes black particles 104 no differently than the sub-assembly 100 of FIG. 1. The blue sub-assembly 402B also includes fluid 404. In one embodiment, the fluid 404 is luminescent fluid that has an emission wavelength band that provides a blue color, no differently than the embodiment of FIG. 1. However, in another embodiment, the fluid 404 is a non-luminescent, transparent fluid. Furthermore, the blue sub-assembly 402B of FIG. 4 can include the electrodes 108 of FIG. 1 in one embodiment, which are not shown in FIG. 4 for illustrative clarity and convenience.

The blue sub-assembly 402B of FIG. 4 includes a wavelength-selective mirror 406. The wavelength-selective mirror 406 of the blue sub-assembly 402B reflects just blue wavelengths of light, and may also reflect near ultraviolet light if the near ultraviolet light is being utilized by a fluid 404 that is luminescent, and the near ultraviolet light is not absorbed by the mirror 406. The mirror 406 is further used in the blue sub-assembly 402B with a fluid 404 that is not luminescent (i.e., that is transparent) in one embodiment if the internal emission efficiency of the blue luminophores cannot be made adequately high, or the projection or out-coupling of the blue luminescence is not sufficiently efficient. Such efficiencies are of particular concern for the blue sub-pixel, because a smaller fraction of available ambient light is generally absorbed by the luminescent fluid 404, particularly just deep blue light and/or near-ultraviolet light.

In FIG. 4, the red sub-assembly 100R can include a mirror 106 that reflects all wavelengths of at least visible (white) light if the non-red wavelengths are absorbed by the luminescent fluid 102 of the sub-assembly 100R within two passes through the fluid 102. However, if the luminescent fluid 102 absorbs most of the wavelengths during their first pass through the fluid 102, then the mirror 106 of the red sub-assembly 100R does not have to reflect all such wavelengths, in which case it can be sufficient for the mirror 106 to reflect just the red light not absorbed by the fluid 102. Similarly, the mirror 106 of the green sub-assembly 100G can reflect all wavelengths except for red wavelengths of light—i.e., it can reflect green and blue wavelengths of light.

In FIG. 5, the assembly 300 includes the red sub-assembly 100R and the green sub-assembly 100G no differently than the embodiment of FIG. 3. However, the blue sub-assembly 100B has been replaced by the blue sub-assembly 502B. As depicted in FIG. 5, the blue sub-assembly 502B includes white particles 504 instead of black particles 104 as in FIG. 1. The white particles 504 reflect wavelengths of at least visible (white) light, as opposed to absorbing such wavelengths as the black particles 104 do. The white particles 504 may be titanium dioxide or other materials having a high index of refraction in the visible band of light. The blue sub-assembly 502B further includes an absorbing material 506 in lieu of a mirror 106 as in FIG. 1. The absorbing material 506 absorbs wavelengths of at least visible (white) light, and may be carbon black, a broadly absorbing inorganic black pigment, a broadly absorbing photonic structure, or some combination of these materials.

The blue sub-assembly 502B of FIG. 5 also includes absorbing fluid 503 instead of luminescent fluid 102 as in FIG. 1. The absorbing fluid 503 has a defined wavelength range, and may be an organic solvent containing one or more optically absorbing organic dyes or pigments. The fluid 503 thus absorbs wavelengths of at least visible (white) light that are outside the defined wavelength range. The defined wavelength range corresponds to blue wavelengths of light. The blue sub-assembly 502B of FIG. 5 can also include the electrodes 108 of FIG. 1 in one embodiment, which are not shown in FIG. 5 for illustrative clarity and convenience.

The white particles 504 of the blue sub-assembly 502B of FIG. 5 are positionable within the fluid 503 in a similar manner to how the black particles 104 of the sub-assembly 100 of FIG. 1 are positionable within the fluid 102, as has been described in relation to FIGS. 1 and 2A-2D. The white particles 504 of the blue sub-assembly 502B are positioned within the fluid 503 in accordance with the color to be displayed by the sub-assembly 300 itself. For a given blue value, the white particles 504 are positioned somewhat differently, however, than the black particles 104 of the blue sub-assembly 100B of FIG. 3 are.

Specifically, when the blue sub-assembly 502B is to output maximum white light, the white particles 504 are positioned at the top side of the sub-assembly 502B, as depicted in FIG. 5. When the blue sub-assembly 502B is to output maximum value of blue light, the white particles 504 are positioned at the bottom side of the sub-assembly 502B, similar to as in FIG. 2A. When the blue sub-assembly 502B is to output no light (i.e., corresponding to the color black), the white particles 504 are positioned at the bottom left or right corner of the sub-assembly 502B, similar to as in FIG. 2B. When the blue sub-assembly 502B is to output a level of blue light less than the maximum value, some white particles 504 are positioned at the top side of the sub-assembly 502B, and other white particles 504 are not, similar to as in FIG. 2C or FIG. 2D.

The embodiment of FIG. 5 helps equalize the maximum amount of blue light that the blue sub-assembly 502B can output as compared to the maximum amounts of red and green light that the red and green sub-assemblies 100R and 100G can output. This is accomplished by the white particles 504 reflecting the blue light that is not absorbed by the absorbing fluid 503. That is, when visible (white) light is incident to the top side of the blue sub-assembly 502B and at least some white particles 504 are not at the top side of the sub-assembly 502B, the fluid 503 absorbs non-blue wavelengths of this light, and the remaining blue light is reflected by the white particles 504.

In this respect, it is noted that when the white particles 504 are spread across the bottom of the blue sub-assembly 502B, they act as a broadband mirror. As such, no more blue light is returned per unit area than if such a mirror were used. By comparison, when the white particles 504 are spread across the top side of the blue sub-assembly 502B, all the visible wavelengths of light are returned, which helps to boost the brightness of a white state. Because red and green wavelengths are also reflected, the red and green sub-assemblies 502R and 502G can be made smaller, to leave more room for the blue sub-assembly 502B, which in this case can also be referred to as a blue-white sub-assembly. By having such a blue-white sub-assembly 502B in this case, a color gamut appropriate for a given display application can be more easily engineered.

FIG. 6 shows a method of use 700 of an assembly corresponding to a pixel, where the assembly has sub-assemblies corresponding to sub-pixels of this pixel, according to an embodiment of the disclosure. The method 700 receives a color to be displayed by the assembly (702). The color is separated into values for the sub-pixels of the pixel (704). For example, a color of the pixel may be defined as values for red, green, and blue parts (or components) of the red, green, and blue sub-pixels, respectively, of the pixel.

For each sub-assembly, the method 700 causes the particles of the sub-assembly to be positioned within the fluid of the sub-assembly so that the sub-assembly displays a color corresponding to the value of its sub-pixel (706). For example, the sub-assembly corresponding to the red sub-pixel displays an intensity of the color red corresponding to the value of the red sub-pixel. Likewise, the green sub-assembly displays an intensity of the color green corresponding to the value of the green sub-pixel, and the blue sub-assembly displays an intensity of the color blue corresponding to the blue sub-pixel.

Specifically, in the case where a given sub-assembly is implemented as the sub-assembly 100 of FIG. 1, the black particles 104 are positioned within the luminescent fluid 102, via generation of an appropriate electric field by the electrodes 108, so that the proper intensity of the color to which the sub-assembly corresponds is displayed. Each such sub-assembly 100 displays the proper intensity of its corresponding color via the interaction of light with the luminescent fluid 102, the black particles 104, and the mirror 106 disposed at the bottom end of the sub-assembly 100. The luminescent fluid 102 converts wavelengths of light shorter than its absorption edge wavelength to the emission wavelength band, as has been described.

Figure 7:
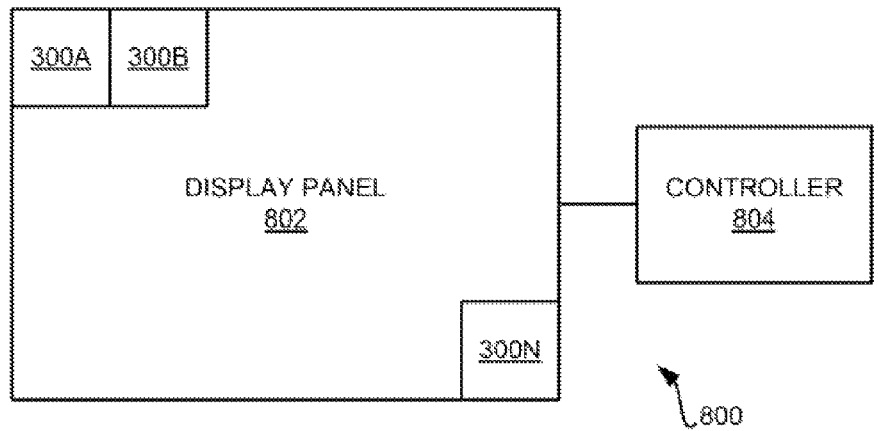
FIG. 7 is a diagram of a rudimentary display device, according to an embodiment of the disclosure.

In conclusion, FIG. 7 shows a rudimentary display device 800, according to an embodiment of the disclosure. The display device 800 includes a display panel 802 and a controller 804. The display panel 802 is made up of a number of assemblies 300A, 300B, . . . , 300N, collectively referred to as the assemblies 300, and which correspond to a number of pixels of the display panel 802. For example, for a display panel 802 having a resolution of X-by-Y pixels, there are X-times-Y assemblies 300.

Each assembly 300 can be implemented as has been described in relation to FIG. 3, 4, 5, or 6. As such, each assembly 300 includes a number of sub-assembles, as has been described. Where each assembly 300 includes red, green, and blue sub-assemblies, this means that there are a total of three-times-X-times-Y sub-assemblies within the display panel 802.

The controller 804 is implemented at least in hardware, such as via one or more integrated circuits (IC's). The controller 804 appropriately controls the sub-assemblies of the assemblies 300 so that the assemblies 300 each display the color of a corresponding pixel of a desired image received by the controller 804. For instance, where the sub-assemblies include electrodes, such as the electrodes 108 of FIG. 1, the controller 804 appropriately causes the electrodes 108 to generate an electric field so that the assemblies 300 display the proper colors.

The controller 804 may receive the image from a competing device, or another type of electronic device, such as an optical disc player, a cable television box, a satellite television box, and so on. The controller 804 may further receive the image from a memory that is internal or external to the display device 800 itself. For example, data representing an electronic book may be communicated to the controller 804, over a network, and from a memory card inserted into the display device 800. The controller 804 renders the text of a page of the book, and causes the assemblies 300 to appropriately display the page.

As has been noted above, in at least some embodiments, once the particles of the sub-assemblies of the assemblies 300 have been positioned within the fluid in accordance with particular colors to be displayed, power may be removed from the assemblies 300 such that the assembles 300 still display these colors. That is, the assemblies 300 do not have to be continually refreshed to display a desired image. As such, the display device 800 typically consumes less power than a display device that has to refresh the displayed image a number of times per second using electricity, because the assemblies 300 consume power just when their corresponding image parts change.

Finally, although embodiments have been described herein that pertain to a full-color display—i.e., in relation to an assembly that has sub-assemblies corresponding to different color parts or components of the color of a pixel—other embodiments can be implemented that pertain to a black-and-white or a grayscale display. In such an embodiment, an assembly may have as few as one sub-assembly, but may have more than one sub-assembly, which each correspond to the color black. One sub-assembly may be employed where different intensities of gray can be displayed by the single sub-assembly, or where just a black-and-white display is desired. More than one sub-assembly may be employed where a grayscale display is desired but where a given sub-assembly can just display black or can just display white. Furthermore, embodiments can include more than three sub-assemblies per pixel. As one example, a pixel may encompass a red sub-assembly, a green sub-assembly, a blue sob-assembly, as well as a white sub-assembly.

We claim:

1. An assembly corresponding to a pixel, comprising:
   a plurality of sub-assemblies, each sub-assembly corresponding to a sub-pixel of the pixel,
   where at least a first of the sub-assemblies comprises:
      a luminescent fluid to convert wavelengths of light less than a conversion wavelength of the sub-assembly to the conversion wavelength; and
      a plurality of black particles positionable within the luminescent fluid in accordance with a color to be displayed by the assembly; and
   where at least a second of the sub-assemblies comprises:
      an absorbing fluid to absorb wavelengths of light outside a defined wavelength range;
      a plurality of white particles positionable within the absorbing fluid in accordance with a color to be displayed by the assembly, wherein, when the white particles are:
         positioned towards a top end of the second sub-assembly, a number of wavelengths of visible light that reach the absorbing fluid is minimized and a greater amount of the visible light is emitted;
         positioned towards a bottom end of the second sub-assembly, the number of wavelengths of the visible light that reach the absorbing fluid is maximized and wavelengths within the defined wavelength range are emitted; and
      an absorbing material disposed at a bottom end of the second sub-assembly.

2. The assembly of claim 1, wherein the visible light is absorbed by the absorbing material at the bottom end of the second sub-assembly after it enters through the top end of the sub-assembly and exits through the top end of the second sub-assembly.

3. The assembly of claim 1, wherein the luminescent fluid comprises one or more of:
   a luminophore having the conversion wavelength;
   a sensitizer to absorb predetermined wavelengths and to transfer energy resulting from absorption of the predetermined wavelengths to the luminophore.

4. The assembly of claim 1, wherein the black particles of the first sub-assembly is positionable within the luminescent fluid responsive to an electric fluid generated within the luminescent fluid, and the second of the sub-assemblies further comprises:
   a plurality of electrodes to generate the electric field in accordance with the color to be displayed by the assembly.

5. The assembly of claim 1, wherein the sub-assemblies comprise:
   the first sub-assembly corresponding to a red sub-pixel of the pixel, the conversion wavelength of the first sub-assembly being a red wavelength;
   the second sub-assembly corresponding to a blue sub-pixel of the pixel, the conversion wavelength of the second sub-assembly being a blue wavelength; and,
   a third sub-assembly corresponding to a green sub-pixel of the pixel, the conversion wavelength of the third sub-assembly being a green wavelength.

6. The assembly of claim 5, wherein a mirror disposed at the bottom of each of the first sub-assembly and the third sub-assembly is one of a broadband mirror and a wavelength-selective mirror.

7. A display device comprising:
a plurality of assemblies corresponding to pixels, each assembly comprising a plurality of sub-assemblies, each sub-assembly corresponding to a sub-pixel of the pixel to which the assembly corresponds,
where at least a first of the sub-assemblies comprises:
a luminescent fluid to convert wavelengths of light less than a conversion wavelength of the sub-assembly to the conversion wavelength;
a plurality of black particles positionable within the luminescent fluid in accordance with a color to be displayed by the assembly; and
a mirror disposed at a bottom end of the first sub-assembly; and
where at least a second of the sub-assemblies comprises:
an absorbing fluid to absorb wavelengths of light outside a defined wavelength range;
a plurality of white particles positionable within the absorbing fluid in accordance with a color to be displayed by the assembly, wherein, when the white particles are:
positioned towards a top end of the second sub-assembly, a number of wavelengths of visible light that reach the absorbing fluid is minimized and a greater amount of the visible light is emitted;
positioned towards a bottom end of the second sub-assembly, a number of wavelengths of the visible light that reach the absorbing fluid is maximized and wavelengths within the defined wavelength range are emitted; and
positioned towards a bottom side of the sub-assembly, a minimum amount of visible light is emitted; and
an absorbing material disposed at a bottom end of the second sub-assembly.

8. The display device of claim 7, wherein the sub-assemblies comprises one of:
the first sub-assembly corresponding to a red sub-pixel of the pixel, the conversion wavelength of the first sub-assembly being a red wavelength, and the mirror disposed at the bottom end of the first sub-assembly being a broadband mirror that is to reflect wavelengths of the visible light; and
a third sub-assembly corresponding to the red sub-pixel of the pixel, the conversion wavelength of the third sub-assembly being a red wavelength, and the mirror disposed at the bottom end of the third sub-assembly being a wavelength-selective mirror that reflects just red wavelengths of light.

9. The display device of claim 7, wherein the sub-assemblies comprises one of:
the first sub-assembly corresponding to the green sub-pixel of the pixel, the conversion wavelength of a third sub-assembly being a green wavelength, and the mirror disposed at the bottom end of the third sub-assembly being a wavelength-selective mirror that reflects just green wavelengths and blue wavelengths of light;
a fourth sub-assembly corresponding to the green sub-pixel of the pixel, the conversion wavelength of the fourth sub-assembly being the green wavelength, and the mirror disposed at the bottom end of the fourth sub-assembly being a wavelength-selective mirror that reflects just the green wavelengths of light.

10. The display device of claim 7, wherein the sub-assemblies comprises:
the second sub-assembly corresponding to a blue sub-pixel of the pixel, the defined wavelength of light of the second sub-assembly being a blue wavelength,
wherein the absorbing material disposed at the bottom end of the second sub-assembly is a wavelength-selective absorbing material that is to absorb wavelengths of light other than the blue wavelengths.

11. The display device of claim 7, wherein the sub-assemblies further comprise a sub-assembly corresponding to a blue sub-pixel of the pixel and comprising:
a transparent fluid;
a plurality of black particles positionable within the transparent fluid in accordance with the color to be displayed by the assembly, the black particles to absorb wavelengths of the visible light; and,
a wavelength-selective mirror disposed at a bottom end of the sub-assembly to reflect just blue wavelengths of the visible light.

12. The display device of claim 7, wherein the sub-assemblies further comprise a sub-assembly corresponding to a blue sub-pixel of the pixel and comprising:
the absorbing fluid that absorbs wavelengths of light that are outside the defined wavelength range, the defined wavelength range corresponding to blue wavelengths; and
the white particles that reflect wavelengths of the visible light.

13. A method comprising:
receiving a color to be displayed by an assembly corresponding to a pixel;
separating the color to be displayed by the assembly into values for sub-pixels, each sub-pixel corresponding to a sub-assembly of the assembly, where each sub-assembly of the assembly corresponds to a different sub-pixel of the pixel;
wherein for at least a first of the sub-assemblies:
causing a plurality of black particles to be positioned within a luminescent fluid of the first sub-assembly such that the first sub-assembly displays a color corresponding to the value for the sub-pixel to which the first sub-assembly corresponds, and
wherein at least the first of the sub-assemblies displays the color corresponding to the value for the sub-pixel to which the first sub-assembly corresponds via an interaction of light with the luminescent fluid, the black particles, and a mirror disposed at a bottom end of the first sub-assembly, where the luminescent fluid converts wavelengths of light less than a conversion wavelength of the first sub-assembly to the conversion wavelength; and
wherein for at least a second of the sub-assemblies:
causing a plurality of white particles to be positioned within an absorbing fluid of the second sub-assembly such that the second sub-assembly displays a color corresponding to the value for the sub-pixel to which the second sub-assembly corresponds; and
wherein at least the second of the sub-assemblies displays the color corresponding to the value for the sub-pixel to which the second sub-assembly corresponds via an interaction of light with the absorbing fluid, the white particles, and an absorbing material disposed at a bottom end of the second sub-assembly, where the absorbing fluid absorbs wavelengths of light other than a wavelength of light corresponding to the color associated with the second sub-assembly.

14. The method of claim 13, wherein, when the black particles are:
positioned towards a top end of the first sub-assembly, a number of wavelengths of visible light that reach the luminescent fluid is minimized; and positioned towards a bottom end of the first sub-assembly the number of wavelengths of the visible light that reach the luminescent fluid is maximized.

15. The method of claim 14, wherein, when the white particles are:
   positioned towards a top end of the second sub-assembly, a number of wavelengths of visible light that reach the absorbing fluid is minimized and a greater amount of the visible light is emitted;
   positioned towards a bottom end of the second sub-assembly, the number of wavelengths of the visible light that reach the absorbing fluid is maximized and wavelengths within the defined wavelength range are emitted.

\* \* \* \* \*